United States Patent [19]
Gruber

[11] 4,290,338
[45] Sep. 22, 1981

[54] STRADDLE CARTRIDGE FOR A STRADDLE CARTRIDGE ANCHOR

[75] Inventor: Rudolf Gruber, Grossdombra, Austria

[73] Assignee: GD-Anker Gebirgs-Dubel-Anker GmbH & Co. KG, Millstatt am See, Austria

[21] Appl. No.: 58,274

[22] Filed: Jul. 17, 1979

[30] Foreign Application Priority Data

Jul. 7, 1978 [AT] Austria ................................. 4948/78

[51] Int. Cl.³ .............................................. F16B 13/10
[52] U.S. Cl. ........................................ 411/21; 411/65
[58] Field of Search .................. 85/79, 66, 83, 87, 86, 85/88, 63, 23

[56] References Cited
U.S. PATENT DOCUMENTS 3,319,209  5/1967  Reyenga ............................ 85/66 X

FOREIGN PATENT DOCUMENTS 953546   8/1974  Canada ..................................... 85/87
2100379  7/1972  Fed. Rep. of Germany .......... 85/83
2614565  1/1977  Fed. Rep. of Germany .......... 85/87
1264060  5/1961  France ..................................... 85/66
1270522  4/1972  United Kingdom .................... 85/66

*Primary Examiner*—Ramon S. Britts
*Attorney, Agent, or Firm*—Montague & Ross

[57] ABSTRACT

The subject invention relates to a straddle cartridge for a straddle cartridge anchor having a central bore which is adjusted to the conicity of the anchor head and wherein the cartridge parts are held together by means of straddle members arranged in succession parallel with respect to the cartridge axis and in direction of the thick ends of the cartridge parts extending outwardly from the outer walls of the cartridge parts.

5 Claims, 2 Drawing Figures

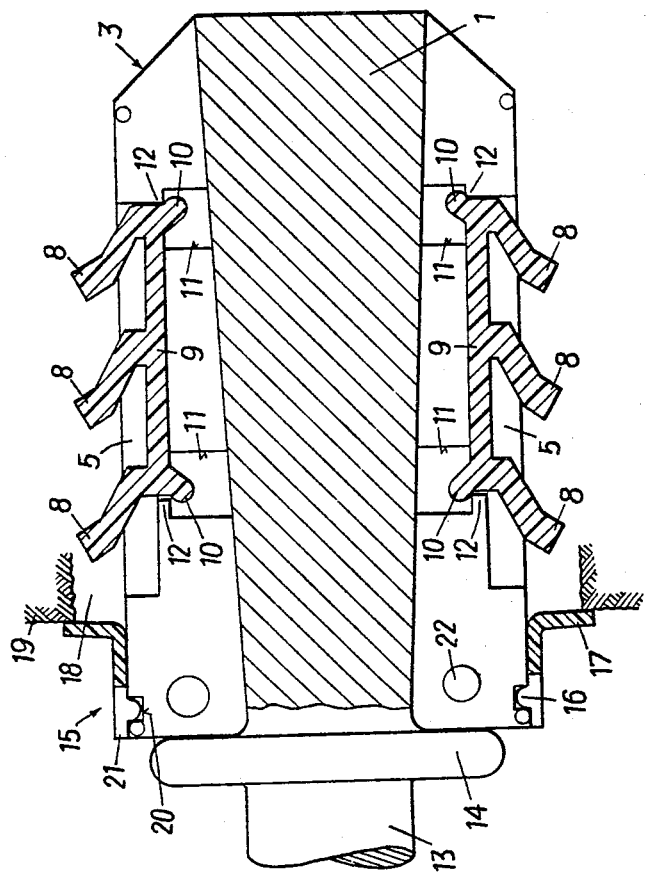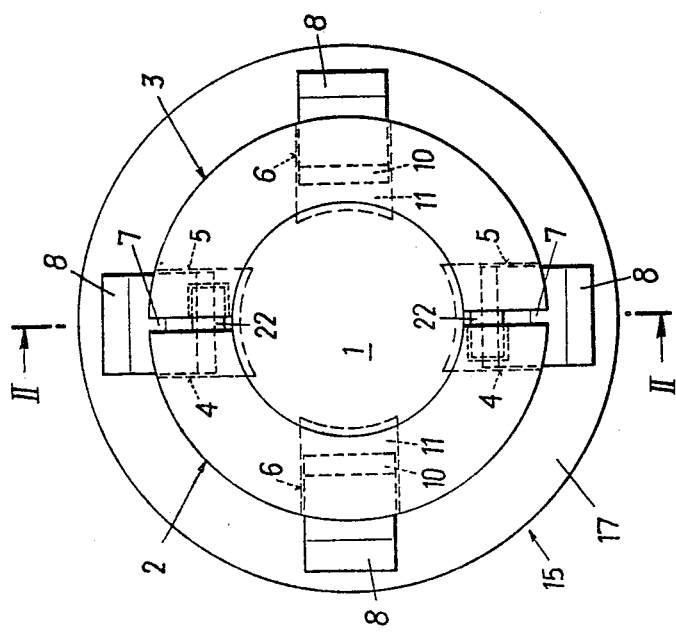

STRADDLE CARTRIDGE FOR A STRADDLE CARTRIDGE ANCHOR

BACKGROUND OF THE INVENTION

Straddle cartridges for known straddle cartridge anchors are made of plastic in one piece. The straddle cartridges with the straddle members have to possess two diametrically opposed characteristics, namely, maximum hardness with a minimum of deformation of the straddle cartridge body so as to enable it to absorb the high pressure forces, and extreme flexibility coupled with a high degree of stiffness which prevent a sliding back of the anchor head due to the spring force and support at the bore wall thus assuring a safe known plastic straddle cartridges constitute a compromise between the opposite requirements. If the straddle cartridge was made of a hard plastic material the straddle members broke off and the anchor was not functional. If the straddle cartridge was made of a flexible plastic material, the pressure resistance did not meet the requirements.

OBJECT OF THE INVENTION

It is an object of the invention to provide a straddle cartridge or expansion anchor which does not have the disadvantages of the known devices.

SUMMARY OF THE INVENTION

The inventive straddle cartridge is characterized in that the straddle members and the cartridge parts consist of materials having different mechanical characteristics, whereby the straddle members have a high degree of a stiff-elastic spring force and the cartridge parts have a maximum of hardness and a high pressure resistance.

For the cartridge and for the straddle members, materials may be used which assure the performance for the different functions of the straddle members and the cartridge parts. That means, that the straddle members can engage the recesses flexibly without breaking during the increasing anchor load and that the cartridge parts which come in contact with the rock bore absorb the high friction and pressure forces, thus securely retaining the anchor head.

In accordance with the invention the straddle members may consist of flexible plastic material and the cartridge parts may consist of hard (stiff) plastic material or metal, for example, steel, aluminum etc.

In a preferred embodiment of the invention the straddle members of each successive row are coupled with a bar which is anchored in a recess of a cartridge part or in opposite recesses of two adjacent cartridge parts. The straddle member bars may be detachably mounted on the cartridge parts by means of screws, tongue and groove coupling, or the like. This is advantageous in that the cartridge parts may be selectively mounted with straddle members whose mechanical characteristics correspond to the given local conditions of the mountings. In specific cases a rigid coupling between the bars and the cartridge parts may be required. In accordance with the invention such a coupling is provided by welding the bars onto the cartridge parts.

An assembly ring may be provided on the straddle cartridge which holds the parts of the straddle cartridge together and facilitates manipulation when inserting a straddle cartridge anchor into the bore hole. Hitherto, this was done by providing rubber rings into circumferential grooves in the cartridge. These rubber rings are advantageous in that they do not interfere with the free sliding of the cartridge parts onto the anchor head during the pull load (stress) of the anchor. However, due to the rough operating conditions which prevail in deep mining operations as well as during the shipping and during storing these rubber rings get lost and in many cases will be damaged it requires testing before using the device to make sure that the rubber rings are present and, if need be, have to be replaced. This of course represents a serious disadvantage. It has been suggested that the rubber rings be replaced by wire loops. However, if the wire loops were not removed before use the cartridge parts could not slide onto the anchor head.

The assembly ring surrounds the rear end of the straddle cartridge as viewed in the feeding direction of the cartridge and is provided, in accordance with the invention, with a flange which is flush with the edge of the front face and with the other edge with an annular shoulder which extends from the inner wall.

The assembly ring is retained on the cartridge or their parts by means of the ring shoulder which engages an annular groove at the outer wall of the cartridge, whereby the ring cannot be removed during shipping and storing of the anchor. When inserting the anchor head and the straddle cartridge which is supported on the flange ring of the anchor into the bore, the flange of the assembly ring comes into engagement with the edge of the bore or hole. During the further insertion of the anchor the ring will be stripped off the cartridge after the annular shoulder exits from the annular groove of the cartridge and the loose cartridge parts which are retained against longitudinal displacement by means of pins in corresponding pocket bores can slide onto the anchor head without any interference upon the application of the pulling load of the anchor, thus establishing a straddling of the anchor head in the bore or hole.

Since the assembly ring seats on the anchor head during the sliding of the cartridge part onto the anchor head and not on the cartridge parts as do the rubber rings, the assembly ring does not have to have the elasticity of rubber rings and may be made of a material with low elasticity and high degree of hardness and can be made in larger dimensions, so as to accommodate the rough operating conditions.

To facilitate the stripping off of the assembly ring from the cartridge axis, parallel slots are provided in the ring which extend from the annular shoulder and through a portion of the height of the ring, in accordance with a preferred embodiment of the invention.

BRIEF DESCRIPTION OF THE DRAWING

FIG. 1 is a plan view of the front end of a two part straddle cartridge mounted on the anchor in feeding direction; and FIG. 2 is a sectional view along lines II—II of FIG. 1.

DESCRIPTION OF AN EMBODIMENT OF THE INVENTION

The straddle cartridge which is mounted on head 1 of the partially shown anchor has two cartridge portions 2, 3 made of a very hard plastic material. Recesses 4, 5 and 6 are provided on the outer walls of the cartridge parts, whereby the recesses 4 and 5 are at both sides of slot 7 between the cartridge parts and the recesses 6 are symmetrically disposed at the plan normal to the slot plane, and that the recesses 4 and 5 together are as wide as recesses 6.

These recesses receive the straddle members 8 which are mounted on a bar 9 and which can be constructed in a unitary piece out of flexible plastic material. The bars are provided with protrusions 10 which extend into apertures 11 of the recesses and engage protrusions 12 for coupling the bars with the cartridge parts, whereby protrusions 12 are mounted on the walls of the recesses.

The straddle cartridge which encompasses the conical anchor head 1 engages with its rear end, seen in feeding direction, a flange ring 14 which is mounted on the anchor rod 13, whereby the diameter of the flange ring is at least as large as the outer cartridge wall.

The cartridge parts may be held together by rubber rings. Instead of rubber rings or in addition to such rings an assembly ring 15 may be provided. The assembly ring when used is mounted on the rear end of the cartridge and holds the parts of the cartridge together. The assembly ring is provided with an annular shoulder 16 in proximity with the front face of the cartridge and flush therewith, and at the inner wall in close proximity with the other edge with a flange 17. The flange has an outer diameter which is larger than the bore hole 18 for the anchor in the schematically shown mountain 19, and the annular shoulder engages an annular groove 20 on the outer wall of the cartridge.

When inserting the anchor head into the bore hole, flange 17 engages the edge of hole 18 and is retained in this position during the further driving of the anchor and is stripped from the cartridge, so that the cartridge parts are loose and can easily be slipped onto the anchor head.

To make sure that the annular shoulder 16 can easily exit from annular groove 20, slots 21 are provided in the annular wall which are evenly distributed around the circumference, for example, offset by about 120° extending parallel with respect to the axis from the annular shoulder and over a portion of the ring height. The two cartridge parts 2 and 3 are secured against a longitudinal displacement by means of pins 22 which engage into pocket bores (FIG. 1).

I claim:

1. A rock bolt expansion anchor for anchoring a tapered head of a rock bolt in a bore, said anchor comprising a generally cylindrical expandable cartridge adapted to fit into said bore and formed with an internal taper complementary to that of said head whereby said cartridge is spread outwardly against the wall of said bore by a force applied to said bolt, and a plurality of straddle members mounted on said cartridge, each of said straddle members comprising a row of outwardly projecting fingers unitarily connected together, said straddle members being of a material having a greater flexibility than that of said cartridge.

2. The expansion anchor defined in claim 1 wherein said cartridge is formed with a plurality of axially extending slots, each of said straddle members being received in respective one of said slots and comprising a bar connected to the fingers of the respective row and received in the respective slot, and means for retaining each of said bars in the respective slot.

3. The expansion anchor defined in claim 2 wherein said cartridge comprises at least two cylindrical segmental members and a ring for temporarily holding said members together, said ring being detachable from said cartridge upon insertion of said cartridge into said bore.

4. The expansion anchor defined in claim 1, claim 2 or claim 3 wherein said straddle members and said cartridge are composed, respectively, of flexible plastic material and rigid plastic material.

5. The expansion anchor defined in claim 1, claim 2 or claim 3 wherein said straddle members are composed of flexible plastic material and said cartridge is composed of metal.

* * * * *